US007275692B2

(12) United States Patent
Natsuno

(10) Patent No.: US 7,275,692 B2
(45) Date of Patent: *Oct. 2, 2007

(54) SINGLE-PASS MAGNETIC READING AND OPTICAL READING APPARATUS AND METHOD

(75) Inventor: Atsushi Natsuno, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/426,510

(22) Filed: Jun. 26, 2006

(65) Prior Publication Data

US 2006/0231621 A1    Oct. 19, 2006

Related U.S. Application Data

(63) Continuation of application No. 11/055,425, filed on Feb. 10, 2005, now Pat. No. 7,090,131.

(30) Foreign Application Priority Data

Feb. 16, 2004  (JP)  ............................. 2004-038473
Feb. 16, 2004  (JP)  ............................. 2004-038474

(51) Int. Cl.
*G06K 7/08* (2006.01)
*G06K 7/00* (2006.01)

(52) U.S. Cl. ...................... 235/449; 235/435; 235/439

(58) Field of Classification Search ................ 235/375, 235/379, 435, 439, 449, 487
See application file for complete search history.

(56) References Cited

U.S. PATENT DOCUMENTS

| 5,544,043 | A | 8/1996 | Miki et al. |
| 5,789,727 | A | 8/1998 | Teradaira et al. |
| 5,965,862 | A | 10/1999 | Momose |
| 6,068,187 | A | 5/2000 | Momose |
| 6,182,896 | B1 | 2/2001 | Momose |
| 6,257,783 | B1 | 7/2001 | Hanaoka et al. |
| 6,290,129 | B2 | 9/2001 | Momose |
| 6,363,164 | B1 | 3/2002 | Jones et al. |
| 6,473,519 | B1 | 10/2002 | Pidhirny et al. |
| 6,739,503 | B1 | 5/2004 | Murison |
| 7,000,828 | B2 * | 2/2006 | Jones .................. 235/379 |
| 7,090,131 | B2 * | 8/2006 | Natsuno ............... 235/449 |
| 7,182,249 | B2 * | 2/2007 | Johannesson et al. ....... 235/375 |
| 2001/0045452 | A1 | 11/2001 | Momose et al. |
| 2005/0129270 | A1 | 6/2005 | Prakash |

FOREIGN PATENT DOCUMENTS

| JP | 7244702 | 9/1995 |
| JP | 944673 | 2/1997 |
| JP | 10278394 | 10/1998 |
| JP | 117497 | 1/1999 |
| JP | 2000259764 | 9/2000 |
| JP | 2000344428 | 12/2000 |
| JP | 2003006173 | 1/2003 |
| JP | 2003006551 | 1/2003 |

* cited by examiner

*Primary Examiner*—Uyen-Chau N. Le
*Assistant Examiner*—April A. Taylor

(57) ABSTRACT

A document reading apparatus reduces processing time and affords excellent ease of use in reading a slip document to acquire magnetic data and/or image data. As the slip is transported through a transportation path, a magnetic reading unit outputs magnetically read data acquired by reading printed magnetic ink characters from the slip and an optical reading unit outputs image data captured by optically imaging the same slip during the same pass through the transportation path. A parameter may be added to a single-pass read command for selectively specifying magnetic reading only, optical reading only, or both magnetic and optical reading as the type or types of reading of a slip during the single pass through the transportation path. Upon receiving the signal-pass read command with the parameter added thereto, a control unit interprets such command and added parameter by selectively controlling the magnetic and optical reading units to executing only the type or types of reading of the slip specified by the parameter in the single-pass read command.

13 Claims, 8 Drawing Sheets

Selecting type of reading process

| Type of reading process | Value (1 bit) | |
| --- | --- | --- |
| | 0 | 1 |
| magnetic reading process | not selected | selected |
| optical reading process | not selected | selected |

Read result of single-pass multiple-reading process

| Function | Value (1 bit) | |
| --- | --- | --- |
| | 0 | 1 |
| MICR read result | normal | error |
| Image read result | normal | error | ns
SINGLE-PASS MAGNETIC READING AND OPTICAL READING APPARATUS AND METHOD

CONTINUING APPLICATION DATA

This application is a continuation of, and claims priority under 35 U.S.C. § 120 on, U.S. application Ser. No. 11/055,425, filed Feb. 10, 2005 now U.S. Pat. No. 7,090,131, the content of which is hereby incorporated by reference in its entirety.

BACKGROUND OF THE INVENTION

1. Field of the Invention

The present invention relates to a document reading apparatus, hybrid processing apparatus, document reading processing system, and document reading processing method for reading small pieces of paper (i.e., slips) on which magnetic ink characters and image data are printed. "Image data" as referred to herein generally includes text, graphics and/or images that are printed on paper by laser, ink-jet, dot-matrix, etc. printing.

2. Description of the Related Art

Slips such as checks have conventionally had essential information such as the bank, account number, and even check amount information printed on the front of the check in magnetic ink. Whether or not a check is valid and can be used is typically determined by reading the magnetic ink information with a document reader that can read the magnetic ink characters while conveying the check or other slip through a document transportation path. In addition to reading magnetic ink characters, demand has also grown for document readers that can optically scan the surface of the entire check and store the scanned check image as image data. This demand has led to the development of document reading apparatuses (hybrid processing apparatuses) that execute both magnetic reading and optical reading processes. See, for example, Japanese Unexamined Patent Appl. Pub. 2003-6713.

In general, a slip reading apparatus such as described above is connected to and communicates with a host device over a network, a serial communication bus, or USB communication channel, for example, to form a document reading processing system for processing checks and other slips. The operation of the document reading apparatus is controlled by specific control commands received from the host device. When a desired slip is read with this document reading apparatus, the host device controls operation by, for example, first sending a control command to read the magnetic ink characters and receive the resulting magnetic ink character data, and then sending a control command to optically read the image on the slip and receive the resulting image data.

To control document reading apparatus operation from the host device as described above, however, the slip must first be loaded and transported in order to read the magnetic ink characters, and then must be loaded again and transported a second time for optical reading. The host device must therefore wait to sequentially acquire the necessary magnetic ink character data and image data. This operation is complicated and inefficient and ease of use is thus poor. The host device also cannot determine the operating condition of the document reading apparatus, and unnecessary reading operations may therefore also be run.

The present invention is therefore directed to solving the foregoing problems, and an object of the invention is to provide a document reading apparatus, method, and document reading processing system whereby both magnetic ink character data and image data can be read and captured from a slip document during a single pass through the transportation path, thus making complicated operation unnecessary, shortening the time required for document reading, and thereby providing excellent convenience and ease of use.

SUMMARY OF THE INVENTION

To achieve the foregoing object, a document reading processing system for reading a slip on which magnetic ink characters are printed is provided. The system comprises a magnetic reading unit configured to magnetically read printed magnetic ink characters from the slip in a transportation path and output magnetic ink character recognition (MICR) data; an optical reading unit configured to optically read an image of a slip in the transportation path and output image data; a processor configured to issue a control command instructing how to read a slip during a single pass of a slip through the transportation path; and a control unit configured to interpret the control command and control the magnetic reading unit and the optical reading unit according to the interpreted control command. The processor is further configured to add to a single-pass read command, which represents one type of control command, a parameter for selectively specifying magnetic reading only, optical reading only, or both magnetic and optical reading as the type or types of reading of a slip during the single pass through the transportation path, and to send the single-pass read command with the parameter added thereto to the control unit. The control unit is further configured to respond to the single-pass read command with the parameter added thereto by selectively controlling the magnetic and optical reading units to executing only the type or types of reading of the slip specified by the parameter in the single-pass read command.

The system is thus configured to perform all desired readings in a single pass of a slip through the transportation path. The system is therefore flexible and is able to perform the desired operations efficiently. When only one or the other of the MICR data or the image data is needed, the parameter can be set to selectively specify the desired type of data to be read from a particular slip, thereby reducing processing time, energy consumption and unnecessary wear and tear on the system.

In one embodiment, the magnetic and optical reading units and control unit are embodied in a document reading apparatus that is in communication with, via a network, a host device for controlling the document reading apparatus. In this embodiment, the command unit is embodied in the host device.

Preferably, the control unit is further configured to generate a read result indicating, for at least each type of reading specified by the parameter, whether the execution of that reading type was normal or whether an error occurred in execution, and to send the read result to the host device. The host device can thus identify whether the process ended normally or ended due to an error based on this returned information. Unnecessary communication processes can then be stopped from running, and processing time can be greatly reduced. User convenience can thus be yet further improved by running a process suited to the current status.

The document reading processing system can also be configured such that magnetically read data or image data is sent to the host device when the host device requests such data. The read data can thus be sequentially stored, linked to a particular slip, in a data storage unit in the host. Data read from a particular slip can thus be quickly confirmed at one time.

In one embodiment, the command unit is further configured to send an MICR data transmission command to the control unit only if the parameter specified magnetic reading of the slip and the read result indicates that the magnetic reading was normal, the control unit being further configured to execute, in response to the MICR data transmission command, an MICR data transmission process in which the MICR data obtained by the magnetic reading unit during the magnetic reading of the slip is transmitted to the host device and stored in the storage unit of the host device. Alternatively, or in addition to, the command unit can be further configured to send an image data transmission command to the control unit only if the parameter specified optical reading of the slip and the read result indicates that the optical reading was normal, the control unit being further configured to execute, in response to the image data transmission command, an image data transmission process in which image data obtained by the optical reading unit during the optical reading of the slip is transmitted to the host device stored in the storage unit of the host device.

The host device can thus easily control the document reading apparatus to execute specific operations according to the combination of control commands sent to the document reading apparatus. The sequence of operations to be carried out for a particular slip can also be easily and freely controlled by issuing the single-pass read command, the MICR data transmission command, and the image data transmission command accordingly.

In one embodiment, the optical reading unit further comprises a first optical reading portion configured to read a front side of a slip in the transportation path and a second optical reading portion configured to read a back side of a slip in the transportation path, the command unit being further configured to add to the image data transmission command an image parameter for selectively specifying whether image data on the front, back, or both sides of a slip is to be transmitted to the storage unit of the host device, and to send the image data transmission command with the image parameter added thereto to the control unit, which is further configured to respond to the image data transmission command with the image parameter added thereto by selectively controlling the transmission of the image data to the storage device in accordance with the image parameter.

The host device can thus set an image parameter to selectively specify which side of the slip to read when image data is needed for only one side of the processed slip, thereby reducing the load on the image scanning process, shortening the processing time, and saving energy.

The document reading processing system described above may further include a printing unit having a print head for printing on the slip. The control unit of the document reading apparatus controls the printing operation of the printing unit based on a control command from the host device.

According to another aspect of the invention, a document reading processing method for reading a slip on which magnetic ink characters are printed, comprises receiving a single-pass read command specifying how to read the slip; interpreting the single-pass read command, including determining whether a parameter for selectively specifying magnetic reading only, optical reading only, or both magnetic and optical reading as the type or types of reading of the slip during the single pass through the transportation path is included in the single-pass read command; and reading the slip in response to the single-pass read command, such that if it is determined that the parameter is included in the single-pass read command, executing only the type or types of reading specified by the parameter in the single-pass read command.

The method may further comprise generating and outputting a read result indicating, for at least each type of reading specified by the parameter, whether the execution of that reading type was normal or an error occurred in the execution.

The method may also comprise sending an MICR data transmission command, if a parameter specifying magnetic reading of the slip is included in the single-pass read command and the read result indicates that the magnetic reading was normal; and executing, in response to the MICR data transmission command, an MICR data transmission process in which the MICR data obtained by the magnetic reading unit during the magnetic reading of the slip is transmitted and stored.

The method may also comprise sending an image data transmission command, if a parameter specifying optical reading of the slip is included in the single-pass read command and the read result indicates that the optical reading was normal; and executing, in response to the image data transmission command, an image data transmission process in which image data obtained by the optical reading unit during the optical reading of the slip is transmitted and stored.

In the situation in which a parameter specifying optical reading of the slip is included in the single-pass read command and the read result indicates that the optical reading was normal, the method may further comprise adding to the image data transmission command an image parameter for selectively specifying whether image data on a front, back, or both sides of a slip is to be transmitted and stored. In such case, the sending step includes sending the image data transmission command with the image parameter added thereto, and the executing step includes executing the image data transmission command with the image parameter added thereto by selectively controlling the transmission of the image data in accordance with the image parameter.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A hybrid processing apparatus and a host device are described by way of example below according to preferred embodiments of the present invention, described first below with reference to FIG. 1 and FIG. 2.

A hybrid processing apparatus provides the functions of two devices in a single unit. More specifically, this hybrid processing apparatus provides the functions of a document reading apparatus that reads both magnetic ink characters and image data from a check or other slip document (simply "slip" below), and performs the functions of a printer for printing on the same slip. The present invention does not, however, require the functions of a printer, and is directed more particularly to the function of the document reading apparatus.

Figure 1:
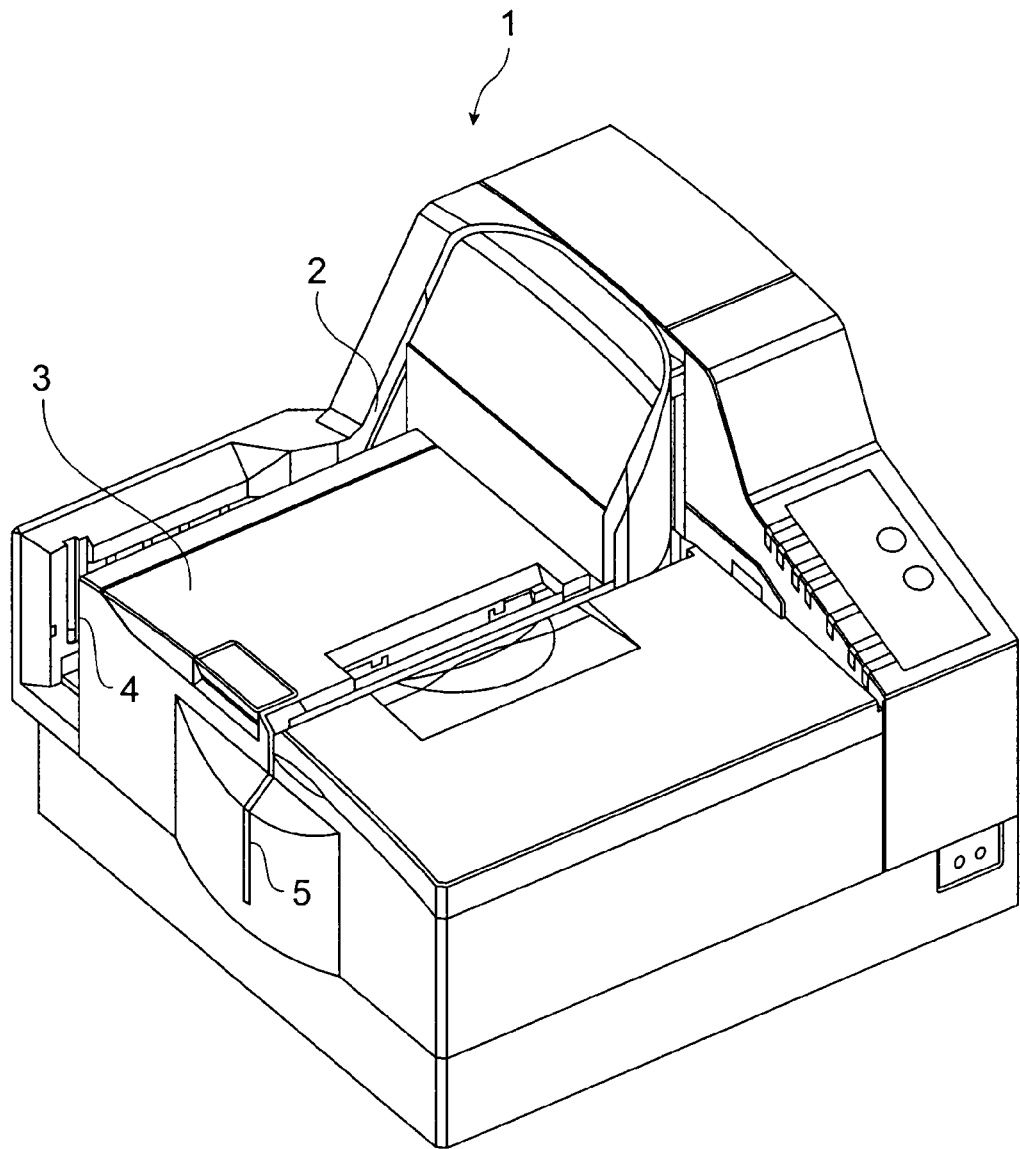
FIG. 1 is an oblique view of the exterior of a hybrid processing apparatus according to a preferred embodiment of the invention.
Figure 2:
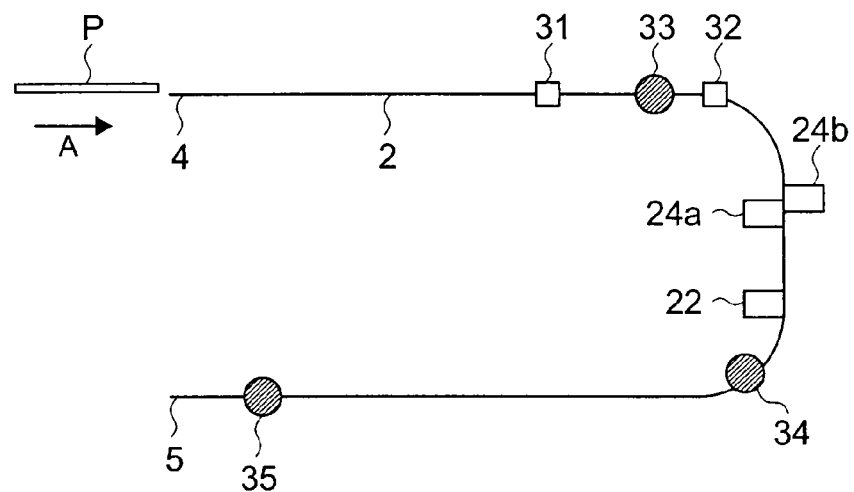
FIG. 2 schematically shows the transportation path in a hybrid processing apparatus according to a preferred embodiment of the invention.

FIG. 1 is an oblique view showing the exterior of a hybrid processing apparatus 1 according to the present invention, and FIG. 2 schematically shows the slip transportation path in this hybrid processing apparatus 1.

As shown in FIG. 1, a hybrid processing apparatus 1 according to this embodiment of the invention has a U-shaped (FIG. 2) transportation path 2 for conveying a check or other slip. A cover 3 covers the top part of this hybrid processing apparatus 1 along the transportation path 2. Checks and other slips are manually inserted into the transportation path 2 from a loading slot 4, and are discharged from an exit 5 at the other end of the transportation path.

FIG. 2 shows parts related to reading a slip P along the transportation path 2 from the loading slot 4 to the exit 5. A line of MICR (magnetic ink character recognition) text containing, for example, the user's account number, serial check number, and other information encoded in magnetic ink characters is printed at a specified position on the front of the slip P. Magnetic ink characters thus printed on a slip P can be read by extracting the magnetic waveform pattern of the magnetic ink characters using an MICR head further described below, and then interpreting the resultant magnetic signal.

As shown in FIG. 2, a slip P inserted to the loading slot 4 is sequentially conveyed in the direction of arrow A by first transportation roller 33 and then second transportation roller 34, and is then discharged by the discharge roller 35 from the paper exit 5. As the slip P is conveyed through the transportation path 2, the document is read according to the position of the slip detected by a BOF (bottom of form) sensor 31 and TOF (top of form) sensor 32.

The slip P is optically read using the front CIS mechanism 24a and back CIS mechanism 24b contained in the CIS (contact image sensor) mechanism further described below, and is magnetically read using an MICR head 22. The front and back sides of a slip P traveling through the transportation path 2 are first optically read by the front CIS mechanism 24a and back CIS mechanism 24b, respectively, and then the magnetic ink characters printed on the front of the slip P are read by the MICR head 22.

Figure 3:
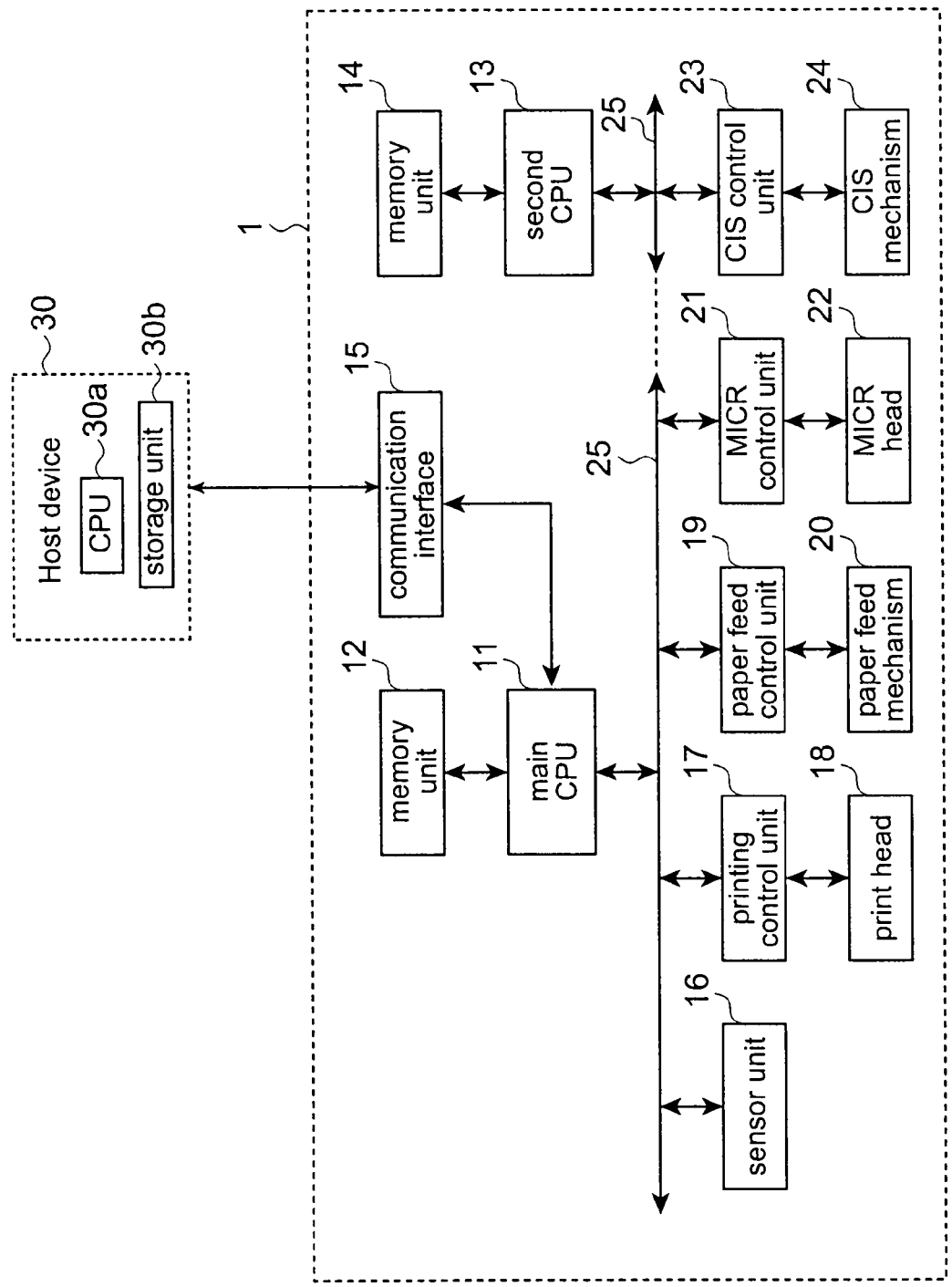
FIG. 3 is a block diagram showing the hardware configuration of a hybrid processing apparatus according to a preferred embodiment of the invention.

FIG. 3 is a block diagram showing the hardware arrangement of this hybrid processing apparatus 1. As shown in FIG. 3, this hybrid processing apparatus 1 has two CPUs, specifically a main CPU 11 handling overall control of the apparatus, and a second CPU 13 for handling primarily the optical reading. A dedicated second CPU 13 is provided for optical data processing because optical scanning is generally processor intensive.

The main CPU 11, which functions as the control unit, runs a desired process using memory unit 12, which contains RAM and ROM, and exchanges control signals and other information with the MICR control unit 21, paper feed control unit 19, printing control unit 17, and sensor unit 16 connected thereto by an internal bus 25.

The second CPU 13 runs the optical imaging process using another memory unit 14, which contains ROM and RAM, and exchanges control signals and data with the CIS control unit 23 connected thereto via the internal bus 25. The main CPU 11 and second CPU 13 are not interconnected via the internal bus 25, but instead communicate through a dedicated port.

The host device 30 is connected to the hybrid processing apparatus 1 over a network. When a specific control command is sent to the hybrid processing apparatus 1 as a function of an application program running on the host device 30, the control command is received from the network by the communication interface 15 and passed to the main CPU 11. The main CPU 11 then analyzes the control command, and controls other parts of the hybrid processing apparatus according to the interpreted control commands. A process run by the main CPU 11 also sends data read from the slip P through the communication interface 15 over the network to the host device 30. This host device 30 includes a CPU 30a that functions as the command unit to control executing a control command transmission process, and has a storage unit 30a that stores data received from the hybrid processing apparatus 1.

The sensor unit 16 contains a variety of sensors disposed for detecting the operating status of the hybrid processing apparatus 1. These sensors include, for example, the BOF sensor 31 and TOF sensor 32 positioned along the transportation path 2, and a sensor for detecting whether the cover of the hybrid processing apparatus 1 is open or closed. Detection signals from the sensors of this sensor unit 16 are output at according to a specific timing to the main CPU 11.

The printing control unit 17 controls driving the print head 18 to print desired print data on a slip P as instructed by the main CPU 11. The print head 18 prints a pattern corresponding to the print data on the slip P as the slip P is conveyed passed the print head 18. The printing control unit 17 and print head 18 together function as a printing unit.

The paper feed control unit 19 drives the paper feed mechanism 20 that contains a motor and rollers as controlled by the main CPU 11 to convey a slip P from the loading slot 4 to the exit 5. Note that the main CPU 11 can appropriately change the transportation speed of the slip P by the paper feed mechanism 20. The paper feed control unit 19 and paper feed mechanism 20 together function as the transportation unit.

The MICR control unit 21 drives the MICR head 22 as instructed by the main CPU 11 to read the magnetic ink characters printed on the slip P and extract a magnetic signal and generate resultant data corresponding to the pattern of the magnetic ink characters. The location of the magnetic ink characters read by the MICR head 22 can be determined from the position of the slip P detected by the sensor unit 16 while the slip P is transported. The MICR control unit 21 and MICR head 22 together function as the magnetic reading unit.

The CIS control unit 23 drives the CIS mechanism 24 as instructed by the CIS control unit 23 to optically scan or read the front and back sides of the slip P and extract an image signal generate resultant data representing images on the slip P. The area that is scanned by the CIS mechanism 24 can be determined from the position of the slip P detected by the sensor unit 16 as the slip P is conveyed through the transportation path 2. This CIS mechanism 24 has a front CIS mechanism 24a and back CIS mechanism 24b as described above, and these scanning mechanisms can be individually controlled. The CIS control unit 23 and CIS mechanism 24 together function as the optical reading unit.

The process whereby the hybrid processing apparatus 1 according to the present invention reads a slip P is described in detail below with reference to FIG. 4 to FIG. 8. The slip P reading processes described below are a magnetic reading process for reading by unit of the MICR control unit 21 and MICR head 22, and an optical reading process for reading by unit of the CIS control unit 23 and CIS mechanism 24.

Figure 4:
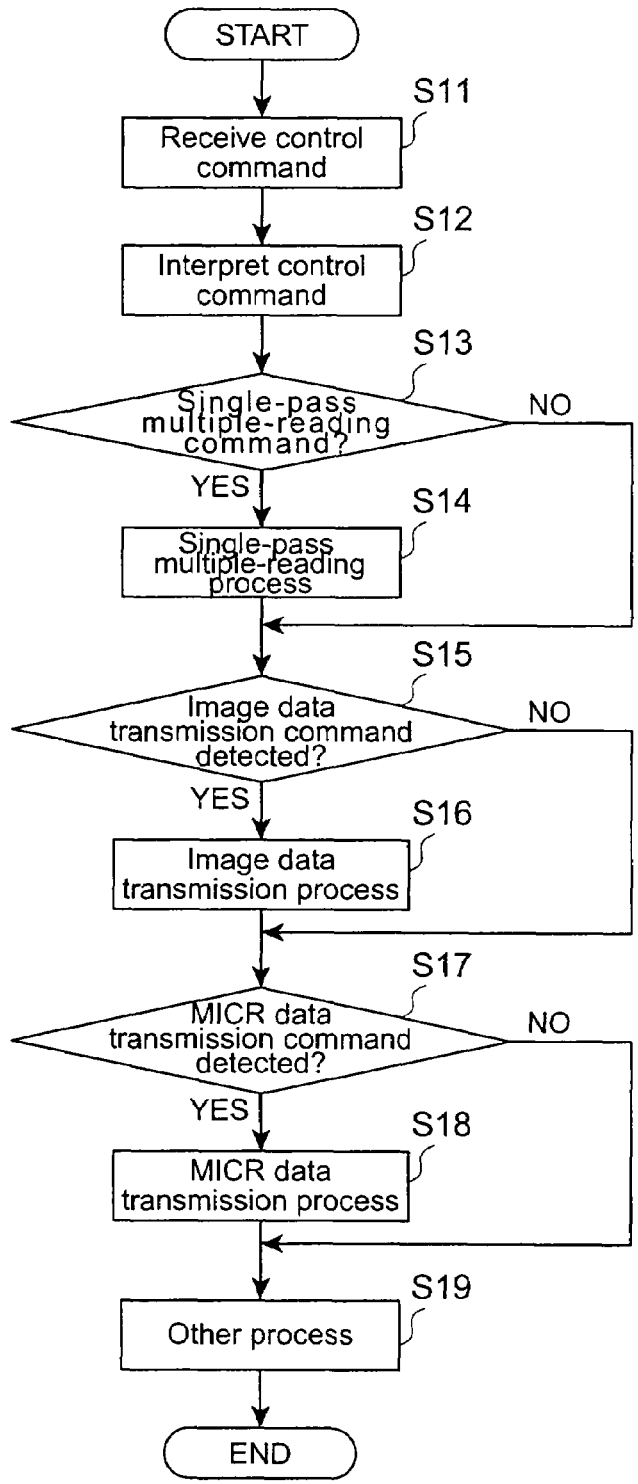
FIG. 4 is a flow chart of the control command receiving process executed by a hybrid processing apparatus according to a preferred embodiment of the invention.

The control command receiving process executed by the hybrid processing apparatus 1 is described first with reference to the flow chart thereof in FIG. 4. A function of the application program run by the host device 30 sends a particular control command before the control command receiving process shown in FIG. 4 runs. The control command sent from the host device 30 is received through the communication interface 15 (step S11). The main CPU 11 interprets the received control command (step S12) to determine the type of control command and extract any additional information sent with the command.

If the received control command is determined in step S12 to be a single-pass multiple-read command (step S13 returns yes), the main CPU 11 controls execution of a single-pass multiple-reading process (step S14). On the other hand, if the received control command is not a single-pass multiple-read command (step S13 returns no), control passes to step S15.

The single-pass multiple-reading process executed in step S14 is a process for reading magnetic ink characters and optically reading the image on the slip during a single transportation operation, that is, during a single pass of the slip through the transportation path 2. It is started in response to a single-pass multiple-read read command sent from the host device 30.

This single-pass multiple-reading process is described in detail below.

If the received control command is determined in step S12 to be an image data transmission command (step S15 returns yes), the main CPU 11 controls executing an image data transmission command (step S16). If the received control command is not an image data transmission command (step S15 returns no), control passes to step S17.

The image data transmission process in step S16 retrieves image data captured from a specific slip P from memory unit 14, and sends the image data to the host device 30. This image data is resultant data that is the result of optical reading of the specific slip P slip previously performed by the hybrid processing apparatus 1 and stored in memory unit 14. The image data transmission process is started in response to an image data transmission command sent from the host device 30.

The image data transmission process is also described in detail below.

If the received control command is determined in step S12 to be an MICR data transmission command (step S17 returns yes), the main CPU 11 controls execution of the MICR data transmission process (step S18). If the received control command is not an MICR data transmission command (step S17 returns no), control passes to step S19.

The MICR data transmission process executed in step S18 reads the MICR data from memory unit 12, and sends the MICR data to the host device 30. This MICR data is resultant data that is the result of the magnetic reading of the specific slip P previously performed by the hybrid processing apparatus 1 and stored to the memory unit 12. The MICR data transmission process is started in response to a MICR data transmission command sent from the host device 30.

If the received control command is determined in step S12 to be some other control command, the process called by that control command is executed (step S19), and the process shown in FIG. 4 ends. Description of control commands other than the three control commands noted above is omitted in this embodiment of the invention.

Figure 5:
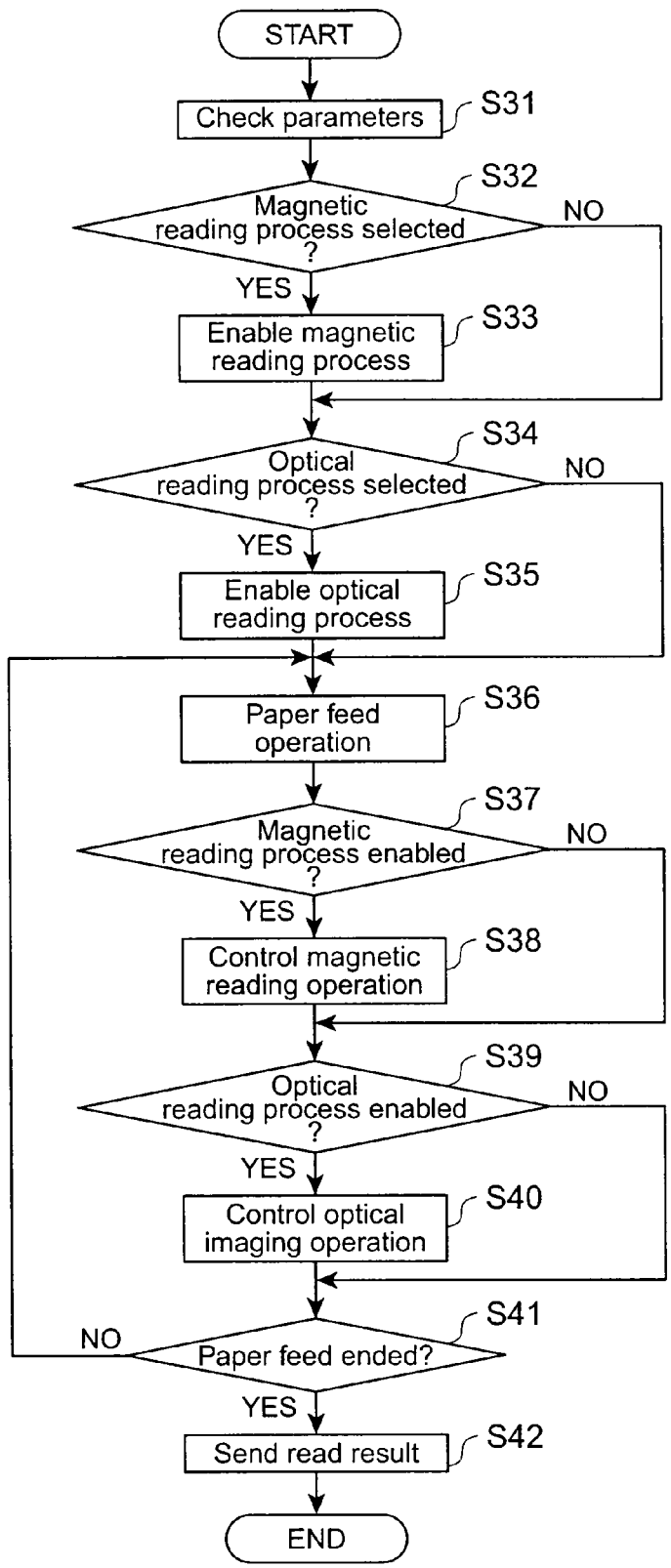
FIG. 5 is a flow chart of the single-pass multiple-reading process executed as step S14 in FIG. 4.

FIG. 5 is a flow chart of the single-pass multiple-reading process executed as step S14 in FIG. 4.

As shown in FIG. 5, the main CPU 11 checks the parameters added to the received single-pass multiple-reading command (step S31). These parameters include a data ID appended to each processed slip P. Reading the data ID thus enables identification of the read slip P. If a specific slip P can be identified by other unit, this data ID can be processed as a constant value. A parameter for selecting the type of reading process to execute is another important parameter that is added to the single-pass multiple-reading command.

Figures 6, 7, 8:
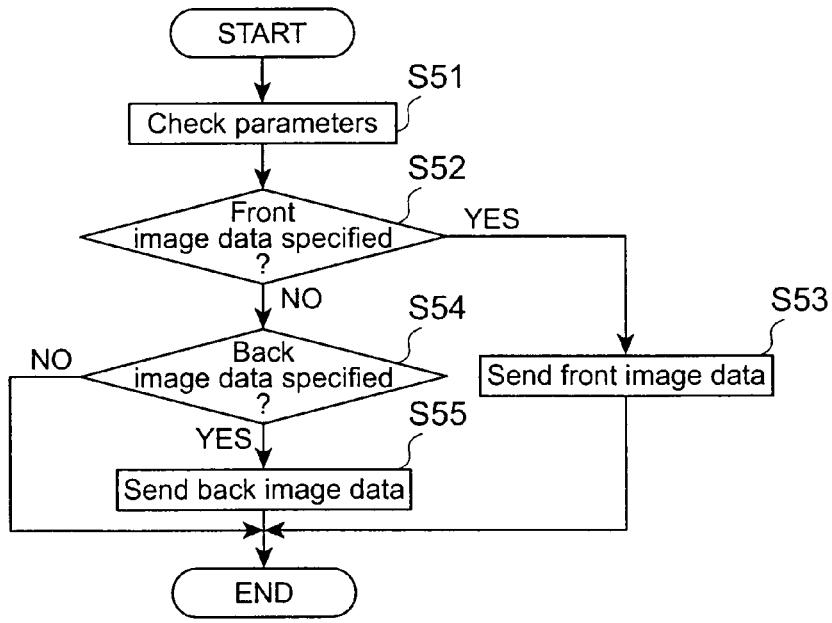
FIG. 6 describes the parameter data added to the single-pass multiple-reading command for selecting the type of reading process to execute.
FIG. 7 describes the content of the read result sent in step S42 in FIG. 5.
FIG. 8 is a flow chart of the image data transmission process run in step S16 in FIG. 4.

FIG. 6 shows the parameters added to the single-pass multiple-reading command for selecting the type of reading process. As shown in FIG. 6, one bit each is allocated to the magnetic reading process and the optical reading process so that both processes can be individually selected or not selected. The host device 30 can thus select both the magnetic reading process and the optical reading process, and can select only the magnetic reading process or only the optical reading process.

If the result of the parameter check in step S31 is that the magnetic reading process is selected (step S32 returns yes), the magnetic reading flag is set to enable the magnetic reading process (step S33). If the magnetic reading process is not selected (step S32 returns no), step S33 is skipped and does not execute.

If the result of the parameter check in step S31 is that the optical reading process is selected (step S34 returns yes), the optical reading flag is set to enable the optical reading process (step S35). If the optical reading process is not selected (step S34 returns no), step S35 is skipped and does not execute.

Note that the process shown in FIG. 5 starts with the magnetic reading flag and optical reading flag not being set, that is, cleared to the disabled state.

The main CPU 11 then applies a command to the paper feed control unit 19 to drive the paper feed mechanism 20 in order to transport the slip P inserted to the hybrid processing apparatus 1, and thus start conveying the slip P referenced to the detection signals from the sensor unit 16 (step S36).

If the magnetic reading flag is set to enable (step S37 returns yes), the main CPU 11 sends a command to the MICR control unit 21 to drive the MICR head 22, and thus controls magnetically reading the slip P (step S38). Magnetic ink characters printed on a specific area of the slip P are read based on detection signals from the sensor unit 16 in step S38.

If the magnetic reading flag is set to the disabled state (step S37 returns no), S38 does not execute.

If the optical reading flag is set to enable (step S39 returns yes), the second CPU 13 sends a command to the CIS control unit 23 to drive the CIS mechanism 24, and thus controls optically reading the slip P (step S40). Step S40 reads specific areas on the front and back sides of the slip P based on detection signals from the sensor unit 16. If the optical reading flag is set to the disabled state (step S39 returns no), step S40 does not execute.

When transportation of the slip P ends (step S41 returns yes), control goes to step S42. However, steps S36 to S41 repeat while slip P transportation continues (step S41 returns no). If step S41 detects that slip P transportation has ended, all required MICR data has been stored in memory unit 12 and all required image data has been stored in memory unit 14.

The read result, that is, information identifying whether the result of the single-pass multiple-reading process is normal or an error has occured, is then generated and sent to the host device 30 from the communication interface 15 (step S42). The operation shown in FIG. 5 then ends.

FIG. 7 show the content of the read result transmitted in step S42. As shown in FIG. 7, one bit each is allocated to the MICR read result and the optical read result as the result of the single-pass multiple-reading process, and each bit can be set separately to indicate whether the corresponding process ended normally or ended due to an error. Note that termination of a reading operation in the single-pass multiple-reading process due to an error can normally be determined based on the detection result from the sensor unit 16.

FIG. 8 is a flow chart of the image data transmission process executed as step S16 in FIG. 4. When an image data transmission command is received, the main CPU 11 checks the parameters added to the received image data transmission command as shown in FIG. 8 (step S51). These parameters include a data ID that can be read to identify the read slip P.

An image data selection parameter for selecting whether to read the front or the back of the slip P is set in the image data transmission command. As a result, each execution of the image data transmission process in this embodiment of the invention transmits image data for only the front side or only the back side of the slip P as specified by this parameter.

If based on the result of step S51 this image data selection parameter is set to retrieve image data for the front of the slip P (step S52), the front image data matching the specified data ID is selected and read from the image data stored in the memory unit 14, and then sent through the communication interface 15 to the host device 30 (step S53).

If this image data selection parameter is not set to the front image data (step S52 returns no) and is set to the back image data (step S54 returns yes), the back image data matching the specified data ID is selected and read from the image data stored in the memory unit 14, and then sent through the communication interface 15 to the host device 30 (step S55). The process shown in FIG. 8 then ends.

If the optical reading process ends in error, the status data stored in RAM in the memory unit 12 is sent to the host device 30 in step S53 or S55. The host device 30 can then reference this status data to determine the cause of the error in the image reading operation.

The MICR data matching the data ID is also read from memory unit 12 in the MICR data transmission process run as step S18 in FIG. 4, and is sent through the communication interface 15 to the host device 30. If the magnetic reading process ended in error, the status data stored in the memory unit 12 is sent to the host device 30. The host device 30 can then reference this status data to determine the cause of the error during the magnetic reading operation.

Figure 9:
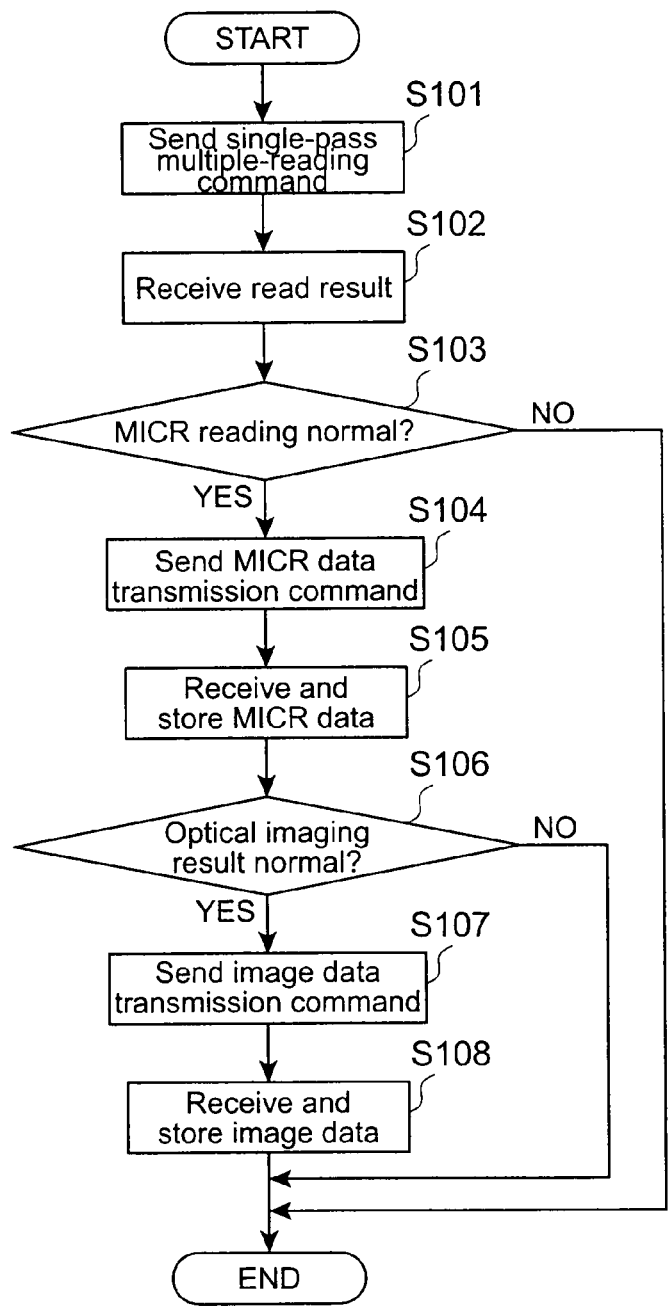
FIG. 9 is a flow chart of a first process executed by the host device.
Figure 10:
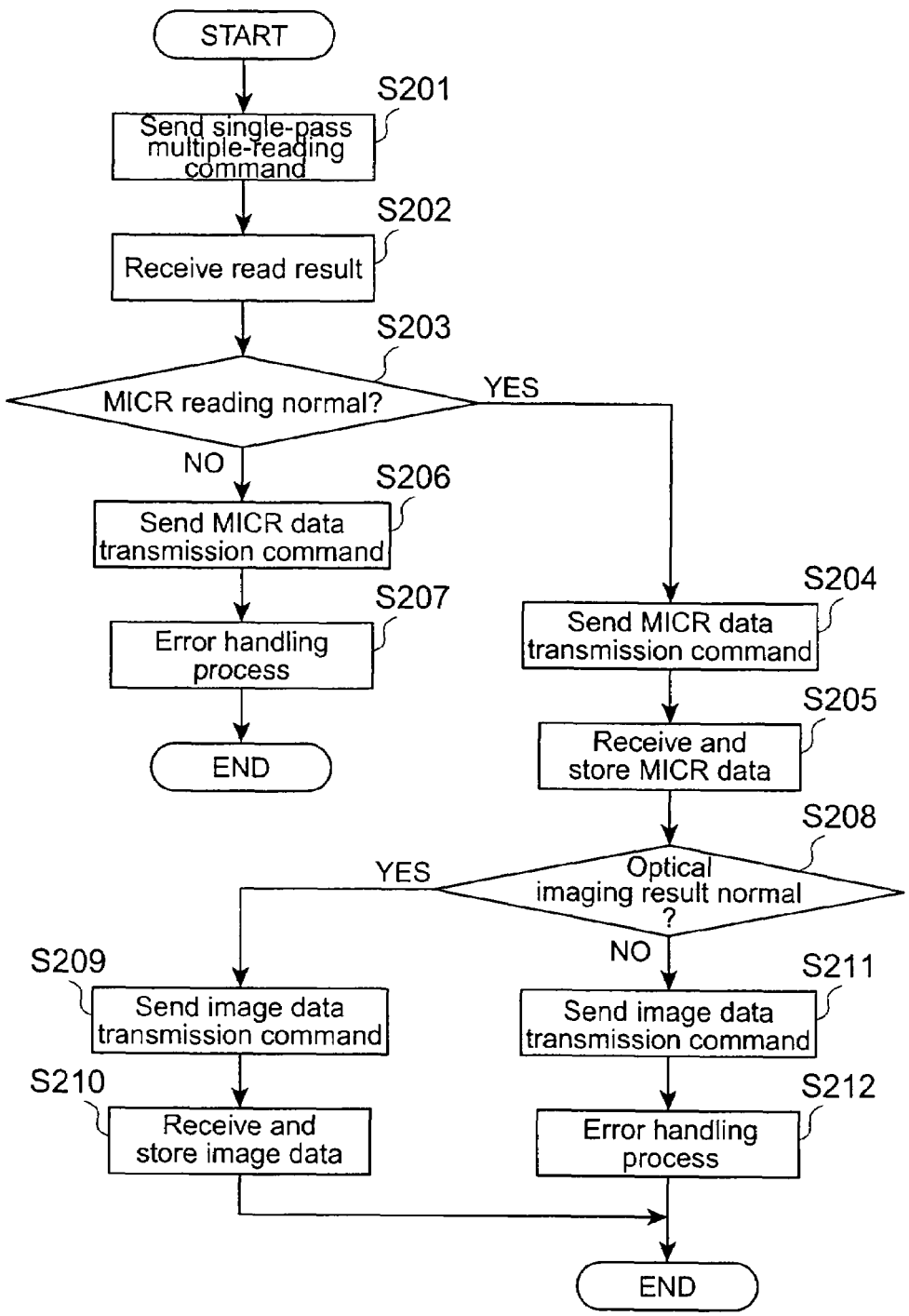
FIG. 10 is a flow chart of a second process executed by the host device.

A process run by a host device 30 using this hybrid processing apparatus 1 is described next. The host device 30 can execute a variety of processes using the hybrid processing apparatus 1 depending upon the functions of the application program, and two typical processes are described below. FIG. 9 is a flow chart of a first process executed by the host device 30, and FIG. 10 is a flow chart of a second process executed by the host device 30.

The first process shown in FIG. 9 sequentially executes the single-pass multiple-reading command, the MICR data transmission command, and the image data transmission command. The host device 30 first sends the single-pass multiple-reading command to the hybrid processing apparatus 1 at a specific time (step S101). The data ID of the slip P to be read is added to the single-pass multiple-reading command as a parameter. The process described in FIG. 9 further assumes that both the magnetic reading process and optical reading process are indicated by parameters as the type of reading process executed in this single-pass multiple-reading process.

When the single-pass multiple-reading command is received, the hybrid processing apparatus 1 runs the single-pass multiple-reading process shown in FIG. 5, and the host device 30 thus receives the read result returned from the hybrid processing apparatus 1 as shown in step S42 in FIG. 5 (step S102).

If the magnetic reading process ended normally (step S103 returns yes) based on the MICR read result contained in the read result received in step S102, the host device 30 sends a MICR data transmission command to the hybrid processing apparatus 1 (step S104). When the hybrid processing apparatus 1 receives the MICR data transmission command, the hybrid processing apparatus 1 runs the MICR data transmission process. As a result, the host device 30 receives and sequentially stores the MICR data from the hybrid processing apparatus 1 in storage device 30b (step S105).

However, if the magnetic reading process ended in error (step S103 returns no) based on the MICR read result contained in the read result received in step S102, the host device 30 stops reading the slip P and the process shown in FIG. 9 ends.

If the optical reading process ended normally (step S106 returns yes) based on the image data read result contained in the read result received in step S102, the host device 30 sends an image data transmission command to the hybrid processing apparatus 1 (step S107). When the hybrid processing apparatus 1 receives the image data transmission command, the hybrid processing apparatus 1 runs the image data transmission process. As a result, the host device 30 receives and sequentially stores the image data from the hybrid processing apparatus 1 in storage device 30b (step S108).

However, if the optical reading process ended in error (step S106 returns no) based on the image data read result received in step S102, steps S107 and S108 do not execute and the process shown in FIG. 9 ends.

The image data transmission command sent in step S107 must indicate whether to retrieve the front or the back image data. To get the image data for both front and back sides of the slip P, steps S107 and S108 must be executed twice with this parameter set to separately specify the front and back sides.

The MICR data and image data sent from the hybrid processing apparatus 1 to the host device 30 is stored in a hard disk or other storage device 30b as digital data linked to the specified data ID as a result of the first process shown in FIG. 9. The host device 30 can thus read the MICR data and image data matching the data ID of the desired slip P from the storage device 30b as needed for presentation and verification on a display, for example.

The second process shown in FIG. 10 likewise sequentially executes the single-pass multiple-reading command, the MICR data transmission command, and the image data transmission command, and adds an error handling process. The host device 30 first sends the single-pass multiple-reading command to the hybrid processing apparatus 1 at a specific time (step S201).

When the single-pass multiple-reading command is received, the hybrid processing apparatus 1 runs the single-pass multiple-reading process shown in FIG. 5, and the host device 30 thus receives the read result returned from the hybrid processing apparatus 1 (step S202).

The parameters added to the single-pass multiple-reading command in steps S201 and S202 are the same as the parameters described in steps S101 and S102 in FIG. 9.

If the magnetic reading process ended normally (step S203 returns yes) based on the MICR read result contained in the read result received in step S202, the host device 30 sends a MICR data transmission command to the hybrid processing apparatus 1 (step S204), and receives and sequentially stores the MICR data from the hybrid processing apparatus 1 in storage device 30b (step S205) as described in steps S104 and S105 in FIG. 9.

However, if the magnetic reading process ended in error (step S203 returns no) based on the MICR read result contained in the read result received in step S202, the host device 30 sends the MICR data transmission command (step S206), and runs an error handling process (step S207).

Because the host device 30 knows in steps S206 and S207 that an error occurred on the hybrid processing apparatus 1 during the MICR data reading process, the host device 30 runs an error handling process to report the error. The cause of the MICR read error can be determined by checking the status data sent to the host device 30 during the MICR data transmission process.

The error handling process executed in step S207 could, for example, present a specific message based on the status data on the display of the host device 30.

The process shown in FIG. 10 ends after step S207 without reading the slip P.

After step S205, the image data read result contained in the read result received in step S202 is checked. If the optical reading process ended normally (step S208 returns yes), the host device 30 sends an image data transmission command to the hybrid processing apparatus 1 (step S209) and thus receives and sequentially stores the image data from the hybrid processing apparatus 1 in storage device 30b (step S210) as described in steps S107 and S108 in FIG. 9.

However, if the optical reading process ended in error (step S208 returns no) based on the image data read result received in step S202, the image data transmission command is sent (step S211) and an error handling process is then run (step S211).

Because the host device 30 knows in steps S211 and S212 that an error occurred on the hybrid processing apparatus 1 during the image scanning process, the host device 30 runs an error handling process to report the error. The cause of the image scanning error can be determined by referencing the status data sent to the host device 30 during the image data transmission process.

The error handling process executed in step S212 could, for example, present a specific message based on the status data on the display of the host device 30.

As a result of the second process shown in FIG. 10, the MICR data and image data sent from the hybrid processing apparatus 1 to the host device 30 is stored in a hard disk or other storage device 30b as digital data linked to the specified data ID, and if an error occurred for some reason, the error status can be reliably determined. The host device 30 operator can then operate the hybrid processing apparatus 1 as needed to correct the cause of the error.

The error content indicated in steps S203 and S208 in FIG. 10 could include, for example, a problem with the slip P, the hybrid processing apparatus 1 cover being open, a malfunction of the MICR head 22, or an error storing data in the memory unit 12, 14. The error messages displayed in the error handling process are therefore preferably set according to the actual error content.

A document reading apparatus and a document reading processing system according to the foregoing embodiments of the invention can thus execute both a magnetic reading process and an optical reading process, and acquire both MICR data and image data, while a slip P is conveyed once through the transportation path 2 when the hybrid processing apparatus 1 receives a single-pass multiple-reading command from the host device 30. Operation of the document reading apparatus is thus simplified on the host device 30 side, processing time can be greatly shortened, and efficiency is improved.

Furthermore, by adding a parameter to the single-pass multiple-reading command to selectively specify the type of data reading process, and using the read result for error processing, a hybrid processing apparatus 1 can be provided as a document reading apparatus affording improved convenience and excellent ease of use for the user of the host device 30.

A document reading apparatus according to the present invention can thus easily link the optically scanned image data of a check with the magnetic ink character data read from the same check because the magnetic reading process and optical reading process are executed during a single pass through the transportation path. More specifically, linking the scanned image data to the magnetic ink character data is not easy with a conventional device, and the image of a previously scanned check could be erroneously linked to the magnetic ink character data read from a check processed therebefore or thereafter. Because the link between the optical image data and magnetic ink character data is unmistakable with the present invention, however, image data and magnetic ink character data can be easily saved to the same file and transferred to the host computer.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A document reading processing system, comprising:
a magnetic reading unit configured to magnetically read printed magnetic ink characters from a slip in a transportation path and output magnetic ink character recognition (MICR) data;
an optical reading unit configured to optically read an image of a slip in the transportation path and output image data;

a processor configured to issue a control command instructing how to read a slip during a single pass of a slip through the transportation path; and a control unit configured to interpret the control command and control the magnetic reading unit and the optical reading unit according to the interpreted control command;

wherein the processor is further configured to add to a single-pass read command, which represents one type of control command, a parameter for selectively specifying magnetic reading only, optical reading only, or both magnetic and optical reading as the type or types of reading of a slip during the single pass through the transportation path, and wherein the processor is further configured to send the single-pass read command with the parameter added thereto to the control unit, the control unit being further configured to respond to the single-pass read command with the parameter added thereto by selectively controlling the magnetic and optical reading units to execute only the type or types of reading of the slip specified by the parameter in the single-pass read command.

2. The document reading processing system described in claim 1, wherein the magnetic reading unit, optical reading unit and control unit are embodied in a document reading apparatus, and wherein the command unit is embodied in a host device in communication with the document reading apparatus.

3. The document reading processing system described in claim 2, wherein the control unit is further configured to generate a read result indicating, for at least each type of reading specified by the parameter, whether the execution of that reading type was normal or an error occurred in the execution and to send the read result to the host device.

4. The document reading processing system described in claim 3, the host device further comprising a storage unit configured to store MICR data and image data, the command unit being further configured to send an MICR data transmission command to the control unit only if the parameter specified magnetic reading of the slip and the read result indicates that the magnetic reading was normal, the control unit being further configured to execute, in response to the MICR data transmission command, an MICR data transmission process in which the MICR data obtained by the magnetic reading unit during the magnetic reading of the slip is transmitted to the host device and stored in the storage unit of the host device.

5. The document reading processing system as described in claim 3, the host device further comprising a storage unit to store MICR data and image data, the command unit being further configured to send an image data transmission command to the control unit only if the parameter specified optical reading of the slip and the read result indicates that the optical reading was normal, the control unit being further configured to execute, in response to the image data transmission command, an image data transmission process in which image data obtained by the optical reading unit during the optical reading of the slip is transmitted to the host device stored in the storage unit of the host device.

6. The document reading processing system as described in claim 5, the optical reading unit further comprising a first optical reading portion configured to read a front side of a slip in the transportation path and a second optical reading portion configured to read a back side of a slip in the transportation path, the command unit being further configured to add to the image data transmission command an image parameter for selectively specifying whether image data on the front, back, or both sides of a slip is to be transmitted to the storage unit of the host device, and to send the image data transmission command with the image parameter added thereto to the control unit, which is further configured to respond to the image data transmission command with the image parameter added thereto by selectively controlling the transmission of the image data to the storage device in accordance with the image parameter.

7. A document reading apparatus for reading a slip on which magnetic ink characters are printed, the apparatus comprising:

a magnetic reading unit configured to magnetically read the printed magnetic ink characters from the slip in a transportation path;

an optical reading unit configured to optically read an image of a slip in the transportation path; and a control unit configured to interpret a single-pass read command, and based on the interpreted single-pass read command, to control the magnetic reading unit and the optical reading unit, the single-pass read command instructing how to read a slip during a single pass of a slip through the transportation path, wherein the control unit is further configured to detect whether a parameter for selectively specifying magnetic reading, optical reading or both as the type or types of reading of the slip during the single pass through the transportation path has been added to the single-pass read command, and wherein the control unit is further configured to selectively execute only the type or types of reading specified by the parameter in the single-pass read command.

8. The document reading apparatus as described in claim 7, wherein the control unit of the document reading apparatus is further configured to generate a read result indicating, for at least each type of reading specified by the parameter, whether the execution of that reading type was normal or an error occurred in the execution.

9. A document reading processing method for reading a slip on which magnetic ink characters are printed, the method comprising:

receiving a single-pass read command specifying how to read the slip;

interpreting the single-pass read command, including determining whether a parameter for selectively specifying magnetic reading only, optical reading only, or both magnetic and optical reading as the type or types of reading of the slip during the single pass through the transportation path is included in the single-pass read command; and reading the slip in response to the single-pass read command, such that if it is determined that the parameter is included in the single-pass read command, executing only the type or types of reading specified by the parameter in the single-pass read command.

10. The document reading processing method as described in claim 9, further comprising generating and outputting a read result indicating, for at least each type of reading specified by the parameter, whether the execution of that reading type was normal or an error occurred in the execution.

11. The document reading processing method as described in claim 10, further comprising:

sending an MICR data transmission command, if a parameter specifying magnetic reading of the slip is included in the single-pass read command and the read result indicates that the magnetic reading was normal; and executing, in response to the MICR data transmission command, an MICR data transmission process in which the MICR data obtained by the magnetic reading unit during the magnetic reading of the slip is transmitted and stored.

12. The document reading processing method as described in claim 10, further comprising:

sending an image data transmission command, if a parameter specifying optical reading of the slip is included in the single-pass read command and the read result indicates that the optical reading was normal; and executing, in response to the image data transmission command, an image data transmission process in which image data obtained by the optical reading unit during the optical reading of the slip is transmitted and stored.

13. The document reading processing method as described in claim 12, wherein, if a parameter specifying optical reading of the slip is included in the single-pass read command and the read result indicates that the optical reading was normal, the method further comprises:

adding to the image data transmission command an image parameter for selectively specifying whether image data on a front, back, or both sides of a slip is to be transmitted and stored;

wherein the sending step includes sending the image data transmission command with the image parameter added thereto, and wherein the executing step includes executing the image data transmission command with the image parameter added thereto by selectively controlling the transmission of the image data in accordance with the image parameter.

* * * * *